US006571106B1

(12) United States Patent
Li

(10) Patent No.: US 6,571,106 B1
(45) Date of Patent: May 27, 2003

(54) METHOD AND APPARATUS FOR GLITCHLESS SIGNAL GENERATION

(75) Inventor: Stephen H. Y. Li, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/352,074

(22) Filed: Jul. 14, 1999

(51) Int. Cl.[7] .................................................. H04B 1/38
(52) U.S. Cl. ........................ 455/550; 709/208; 709/400
(58) Field of Search .............................. 455/557, 550, 455/90; 709/400, 268

(56) References Cited

U.S. PATENT DOCUMENTS 6,006,340 A * 12/1999 O'Connell .................. 709/233
6,208,703 B1 * 3/2001 Cavanna et al. ............ 375/372
6,259,931 B1 * 7/2001 Singh .......................... 455/550
6,260,152 B1 * 7/2001 Cole et al. .................. 709/400

* cited by examiner

Primary Examiner—Thanh Cong Le
Assistant Examiner—Nick Corsaro
(74) Attorney, Agent, or Firm—Gerald E. Laws; W. James Brady, III; Frederick J. Telecky, Jr.

(57) ABSTRACT

A digital system is provided with an interface circuit for interconnecting two modules in different clock domains. The interface circuit can selectively respond to a request signal from a remote source and immediately de-assert a ready signal in response to either a rising edge or a falling edge of the request signal asynchronously to a local clock signal. When an internal circuit connected to the interface circuit has completed a requested operation, the interface circuit asserts the ready signal. The ready signal is de-asserted and asserted in a glitchless manner so that the remote module can respond to the ready signal asynchronously to a remote clock signal.

9 Claims, 6 Drawing Sheets

METHOD AND APPARATUS FOR GLITCHLESS SIGNAL GENERATION

FIELD OF THE INVENTION

This invention generally relates to microprocessors, and more specifically to improvements in interface signaling between modules, systems, and methods of making.

BACKGROUND OF THE INVENTION

Microprocessors are general purpose processors which provide high instruction throughputs in order to execute software running thereon, and can have a wide range of processing requirements depending on the particular software applications involved.

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever increasing DSP performance while keeping power consumption as low as possible.

To further improve performance of a digital system, two or more processors can be interconnected. For example, a DSP may be interconnected with a general purpose processor in a digital system. The DSP performs numeric intensive signal processing algorithms while the general purpose processor manages overall control flow. The two processors communicate and transfer data for signal processing via shared memory. Each processor may be in a different clock domain which requires that each processor synchronize control signals received from the other processor to the clock signal in the local clock domain so that well known problems of runt pulses and metastable anomalies are avoided. Synchronization generally requires several clocked latch stages, so that extra time is required in each handshake cycle between the processors in different clock domains.

SUMMARY OF THE INVENTION

It has now been determined that performance of a handshake operation between modules in different clock domains can be improved by performing at least part of the handshake asynchronously within an interface circuit of the modules. Particular and preferred aspects of the invention are set out in the accompanying independent and dependent claims. Combinations of features from the dependent claims may be combined with features of the independent claims as appropriate and not merely as explicitly set out in the claims. The present invention is directed to improving the performance of processors, such as for example, but not exclusively, digital signal processors.

In accordance with a first aspect of the invention, there is provided a digital system having an internal circuit. An interface circuit is connected to the internal circuit, the interface circuit having a first input for receiving a first signal from a remote source and an output for sending a second signal to a remote destination in response to the first signal. The interface circuit is operable to immediately set the second signal to a first state in a glitchless manner in response to a signal edge in the first signal, and to set the second signal to a second state in a glitchless manner in response to the internal circuit.

According to another aspect of the invention, the interface circuit has a second input for receiving a third signal. The interface circuit is operable to selectively set the second signal to the first state in response to either a rising edge in the first signal or a falling edge in the first signal as selected by the third signal.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the digital system of FIG. 2, unless otherwise stated, and in which.

Corresponding numerals and symbols in the different figures and tables refer to corresponding parts unless otherwise indicated.

DETAILED DESCRIPTION OF EMBODIMENTS OF THE INVENTION

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Figure 1:
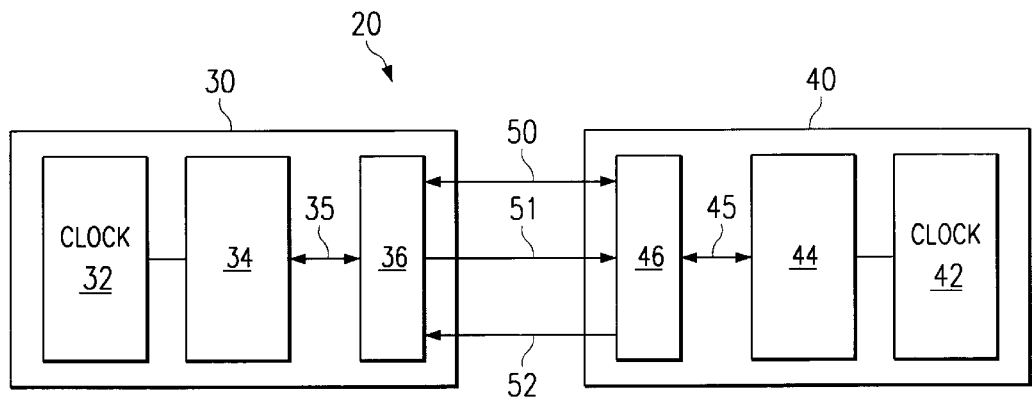
FIG. 1 is a block diagram of a digital system with two modules in different clock domains interfaced together using asynchronous glitchless signaling, according to aspects of the present invention.

FIG. 1 is a block diagram of a digital system 20 with two modules 30, 40 in different clock domains interfaced together using asynchronous glitchless signaling, according to aspects of the present invention. Module 30 has clock generation circuitry 32 connected to internal functional circuitry 34. Interface circuitry 36 is connected to internal circuitry 34 and sends and receives signals to other modules, such as module 40. Module 40 has clock generation circuitry 42 connected to internal functional circuitry 44. Interface circuitry 46 is connected to internal circuitry 44 and sends and receives signals to other modules, such as module 30. Clock circuitry 32 is separate from clock circuitry 42 so that module 30 and module 40 are in different clock domains. Signal lines 50 represent inter-module connections for transferring digital signals, such as for data and addresses. Signal lines 51 and 52 represent control signals used during such data transfers. Advantageously, interface circuitry 36 generates signal 51 asynchronously in a glitchless manner so that interface circuit 46 can be responsive asynchronously to signal edges in signal 51. Likewise, interface circuitry 46 generates signal 52 in a glitchless manner so that interface circuit 36 can be responsive asynchronously to signal edges in signal 52. Since modules 30 and 40 are in different clock domains, being responsive asynchronously to signal edges in control signals 51 and 52 eliminates a need to synchronize the signals to the local clock domain. For example, interface circuit 36 can receive data on bus 50 and latch the data in response to an edge on control signal 51 which indicates the data is valid without synchronizing to clock circuit 32.

Figure 2:
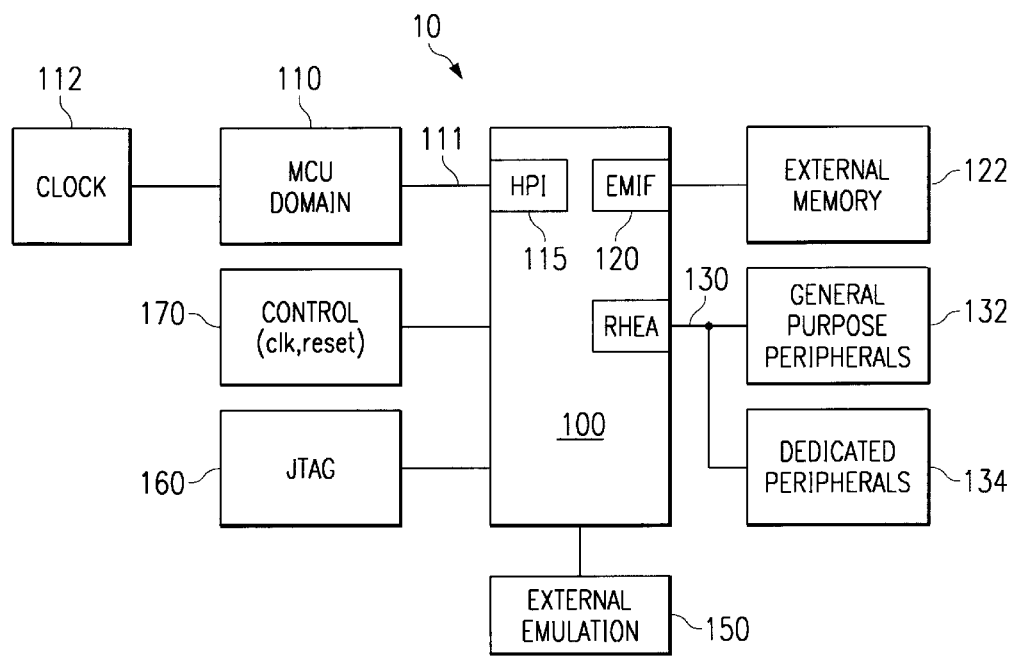
FIG. 2 is a block diagram of another digital system with two processors in different clock domains interfaced together using asynchronous glitchless signaling, according to aspects of the present invention, for sharing a block of memory.

FIG. 2 is a block diagram of another digital system that includes an embodiment of the present invention. Megacell 100 includes a CPU, DMA controller and memory circuits, and will be described in greater detail later. Host processor 110 is connected to megacell 100 via address and data bus 111 to a host port interface 115 provided by megacell 100. Bus 111 includes signals for controlling a transfer between host processor 110 and Megacell 100. Memory 122, general purpose peripherals 132 and dedicated peripherals 134 can be accessed by host processor 110 or the CPU within megacell 100. Control circuitry 170 provides timing signals for circuitry within megacell 100. MCU 110 includes its own timing circuitry 112, which requires that accesses by MCU 110 to resources controlled by megacell 100 must be synchronized to the time base of megacell 100.

JTAG test port 160 contains hardware extensions for advanced debugging features. These assist in the user's development of the application system (software and the hardware) utilizing only the JTAG interface, a test access port and boundary-scan architecture defined by the IEEE 1149.1 standard with extended operating mode enhancements, as described in U.S. Pat. No. 5,828,824. Emulation circuitry 150 provides debug program control and execution tracing facilities.

Figure 3:
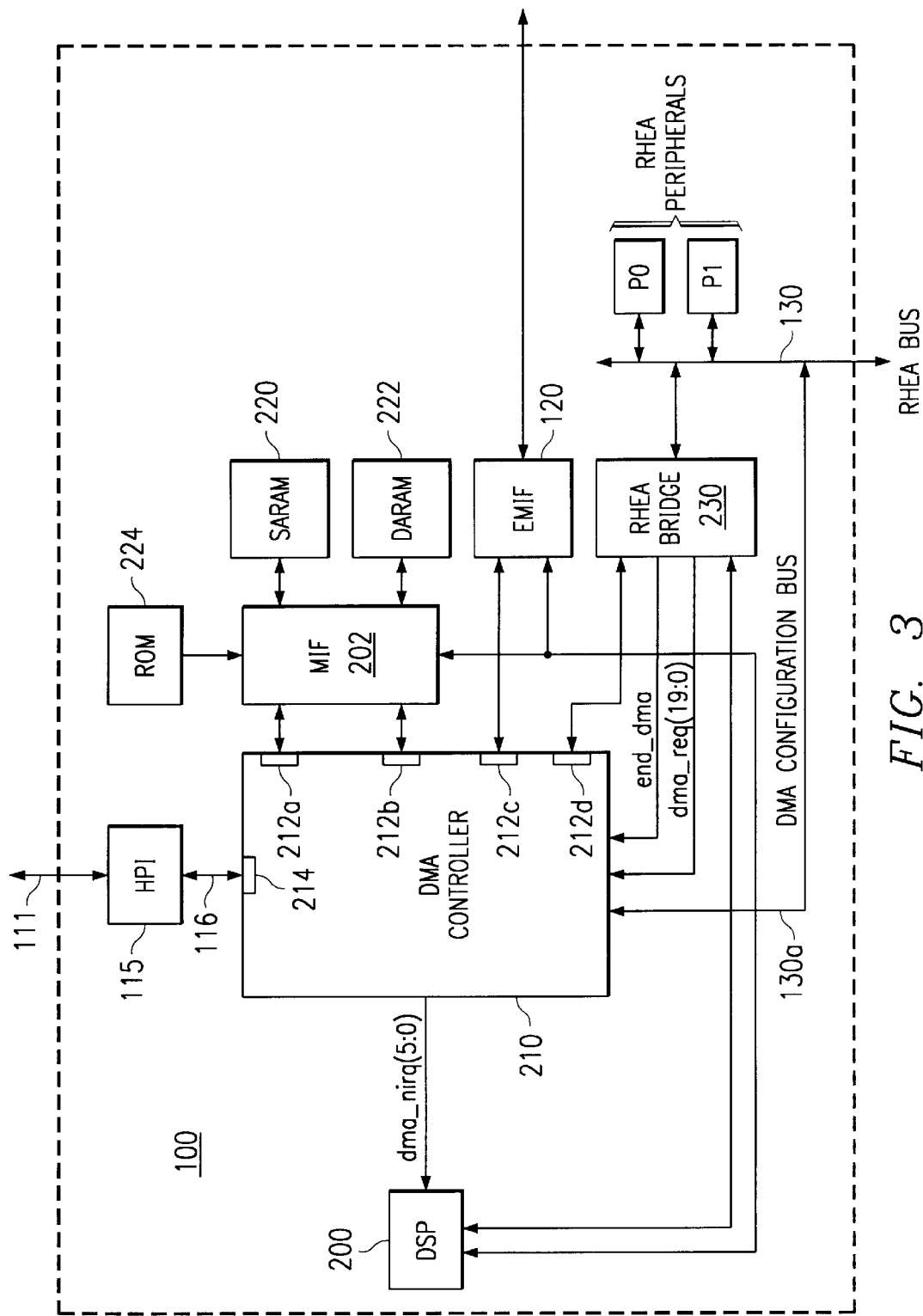
FIG. 3 is a more detailed block diagram of a megacell from the digital system of FIG. 2.

FIG. 3 is a more detailed block diagram of megacell 100. CPU 200 is a digital signal processor (DSP). CPU 200 accesses memory circuits 220, 222 and 224 via memory interface circuitry 202. CPU 200 accesses external memory via external memory interface (EMIF) 120. CPU 200 accesses other resources via RHEA bridge 230 to RHEA bus 130. DMA controller 210 is a multi-channel DMA controller with separate channel and port controllers with each port having local scheduling circuitry. DMA 210 can be programmed to transfer data between various sources and destinations within digital system 10, such as single access RAM 220, dual access RAM 222, external memory 122 via external memory interface 120, and peripheral devices on resource bus (RHEA) 130 via RHEA bridge 230. MCU 110 can also access these resources via host port interface (HPI) 115 which is connected to DMA controller 210 via bus 116. The path between the HPI port and the Memory is a DMA channel.

Memory circuit 220 is a 128K×16 Single Access RAM (SARAM), comprising sixteen 32K byte modules. DMA 210 can access the SARAM by a 16 bit DMA bus. The DMA bus access (R/W) can be in SAM (Shared access mode) or in HOM mode (Host only mode). An access by MCU 110 in HOM mode will bypass synchronization circuitry within DMA 210 that synchronizes MCU timing to megacell 100 timing. A HOM size register is provided so that the size of the HOM memory can be specified by the host processor.

The priority scheme between CPU 200 and DMA 210 is programmable. The priority circuitry is implemented in the SARAM, whereas the control register is located in the DMA IO space accessible via RHEA bus branch 130a.

Memory circuit 222 is a 32K×16 Dual Access RAM (DARAM) comprising four 16K byte modules. CPU 200 can perform two accesses to one DARAM memory module in one cycle; for example, a single read and single write, or a long read and a long write, a dual read and a single write etc. The priorities assigned to the different accesses are handled by the DARAM. The priority scheme between CPU and DMA is programmable. The priority circuitry is implemented in the DARAM, whereas the control register is located in the DMA IO space accessible via the RHEA bus.

Another embodiment of the present invention may have different configurations of memory and peripherals.

FIG. 3 only shows those portions of megacell 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of DMA controller 210 relevant to an embodiment of the present invention are explained in sufficient detail hereinbelow, so as to enable one of ordinary skill in the microprocessor art to make and use the invention.

DMA controller 210 transfers data between points in the memory space without intervention by the CPU. The DMA allows movements of data to and from internal memory, external memory and peripherals to occur in background of CPU operation. The DMA has six independent programmable channels allowing six different contexts for DMA operation, executed in Time Division Multiplexed (TDM) mode.

Host accesses to the SARAM are made using HPI interface 115 via HPI port 214 and a DMA channel. Two access modes are possible. In shared access mode (SAM) both the MCU and the DSP may access the SARAM. All accesses are synchronous to the DSP clock and the priority is controlled by DMEDC configuration register, not shown. In host only mode (HOM) and host high priority mode, only the MCU can access the SARAM and all accesses are asynchronous to the DSP clock. In this case, the DMA channel is bypassed. In this embodiment, high priority accesses are enabled using the same circuitry as HOM accesses, therefore in the following discussion both types of accesses will be referred to as HOM mode accesses.

Each type of transfer discussed above initiated by host processor 110 is via interface circuit 115 which provides a connection to host processor 110. Advantageously, interface circuitry 115 generates control signals in bus 111 in a glitchless manner so that host 110 can be responsive to signal edges in control signals in bus 111. Since processor 110 and megamodule 100 are in different clock domains, being responsive to signal edges in control signals in bus 111 eliminates a need to synchronize the signals to the local clock domain. For example, host processor 110 can receive data on bus 111 that was accessed from shared memory 220 and latch the data in response to an edge on a "ready" control signal in bus 111 which indicates the data is valid without synchronizing to clock circuit 112.

Figure 4:
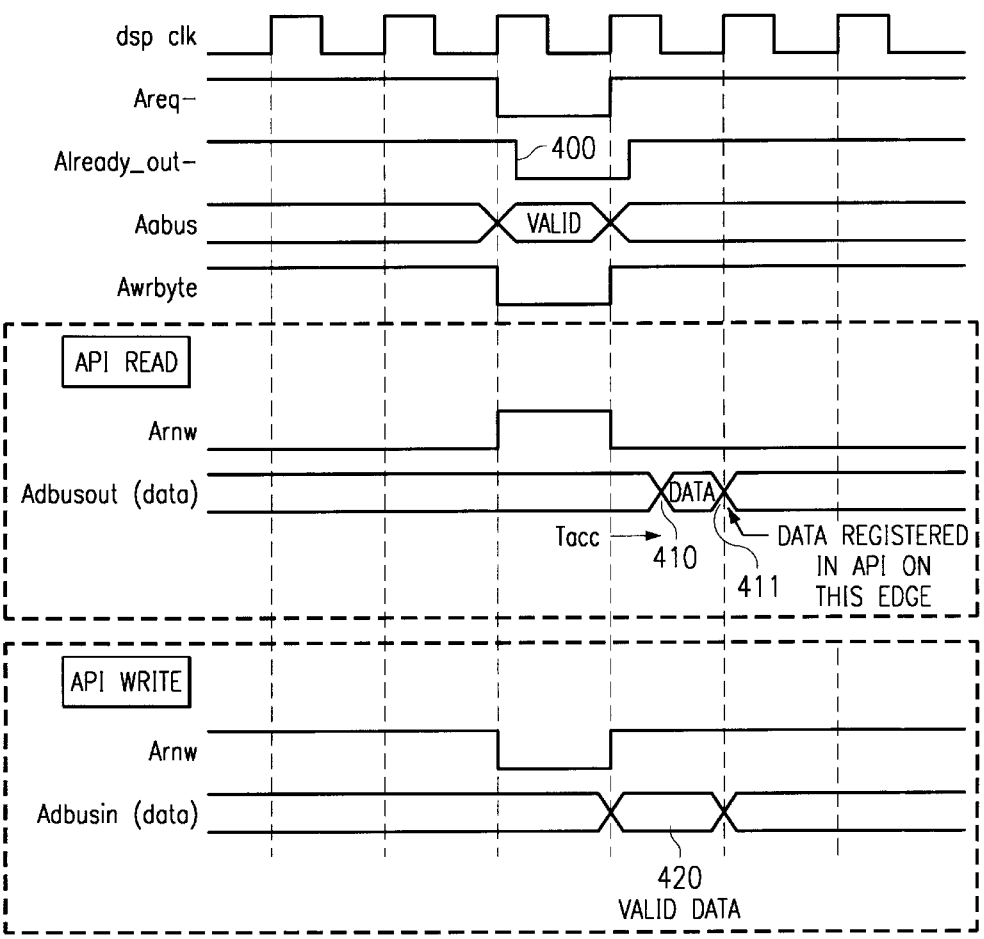
FIG. 4 is a timing diagram for signals between the host processor interface circuit and internal memory illustrating an access to the shared memory by the host processor of FIG. 2 in SAM mode.

FIG. 4 is a timing diagram for signals between host processor interface 115 and internal memory illustrating an SARAM memory access in SAM mode. The Figure shows the timing for both a SAM mode read and a SAM mode write. In SAM mode, all requests are made synchronously to DSP clock signal dsp_clk provided by clock circuitry in control block 170. A request is made by the HPI driving a request signal Areq low in bus 116. Signal Areq is responsive to a request signal HSTRB in bus 111 from host 110. The address signals Aabus, read/write signal rnw, byte signals Awrbyte etc. in bus 116 are also driven in the same clock cycle. As soon as the request is granted by the arbitration logic, the Aready_out signal in bus 116 is driven active (low) as shown at 400.

For a SAM read, the data is driven on data output bus Adbusout in bus 116 by the SARAM in the second cycle on the low phase of dsp_clk as indicated at 410. The data is received and latched in HPI 115 on the following rising edge of dsp_clk at 411.

For a write, the data must be driven by the HPI on the data input bus Adbusin in the second cycle as shown at 420.

Figure 5:
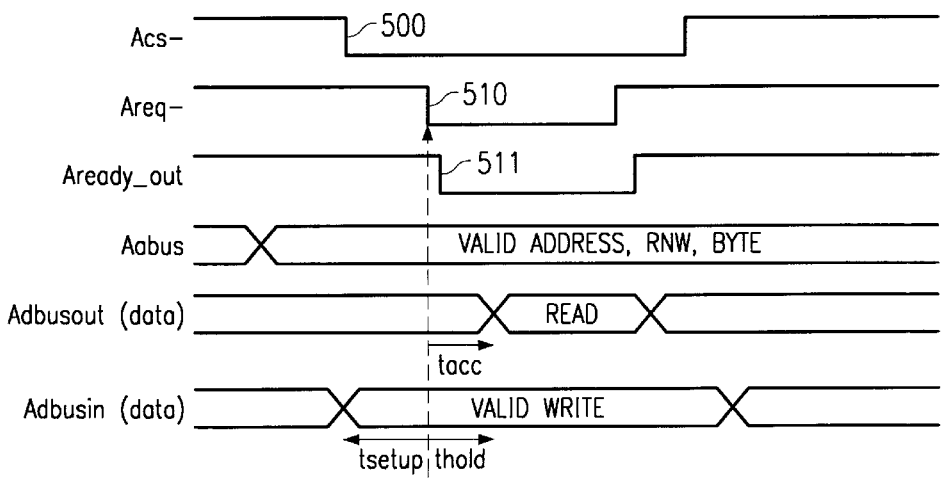
FIG. 5 is a timing diagram for signals between the host processor interface circuit and internal memory illustrating an access to the shared memory by the host processor of FIG. 2 in HOM mode.

FIG. 5 is a timing diagram for signals between host processor interface 115 and internal memory illustrating a memory access in HOM/high priority mode. As discussed above, in this mode, the DMA is bypassed. Therefore, HOM mode makes a direct link between HPI interface 115 and SARAM HPI/DMA port and memory accesses are performed in an asynchronous manner without regard to the clock signal used by DSP 200 and DMA 210.

On system startup, while reset is active, the HPI module will configure the HPI in HOM mode, and load boot code into the SARAM memory. Thus HOM mode accesses must be allowed while reset is active.

In HOM/high priority mode, the HPI module has exclusive access to the SARAM. A HOM mode request is initiated by the HPI asserting the chip select signal Acs in bus 116 at 500. This signal is used to enable the SARAM memory core while request signal Areq is the core strobe signal. The core is accessed on the falling edge of Areq, indicated at 510, for memory reads and writes; thus address bus Aabus, control signals and data input bus Adbusin signals must be valid for a setup time Tsetup before this edge.

As no other module can access the SARAM in HOM mode, the ready signal Aready_out will always be granted at 511 and is simply a buffered version of the Areq input. For a read, the data will be valid after access time Tacc after Aready_out goes active.

Figure 6:
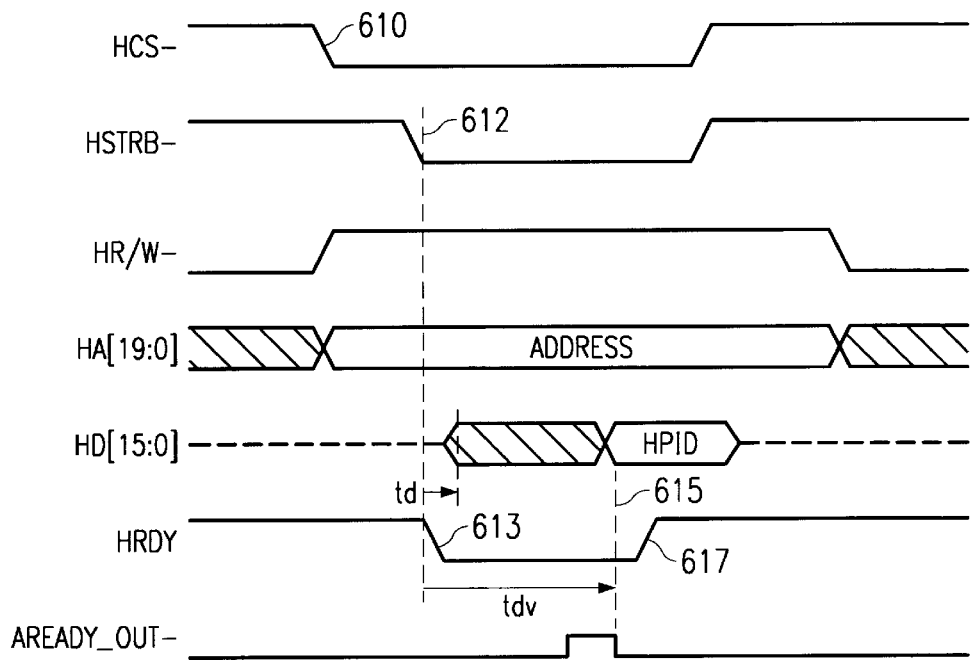
FIG. 6 is a timing diagram for signals between the host processor and the host processor interface illustrating a read access to the shared memory by the host processor of FIG. 2.

FIG. 6 is a timing diagram for signals on bus 111 illustrating a read access to the shared memory by the host processor. Chip select signal HCS- is asserted (low) at time 610 to indicate that an address is present on address signals HA(19:0) and read/write signal HR/W- is asserted to indicate a read request. Request signal HSTRB- is asserted (low) at time 612 to request a memory access. In response to HSTRB- falling edge 612, host processor interface 115 de-asserts ready signal HRDY at 613 to indicate a read access is in progress and data is not available. Once data has been retrieved from internal memory at 615 as indicated by Aready_out-, as described with respect to either FIG. 4 or FIG. 5, HPI 115 asserts ready signal HRDY at 617 to indicate to host 110 that data is available. Advantageously, HPI 115 generates ready signal HRDY in a glitchless manner so that host processor 110 can latch the data on data signals HD(15:0) in response to signal edge 617 without synchronizing to clock circuit 112.

Figure 7:
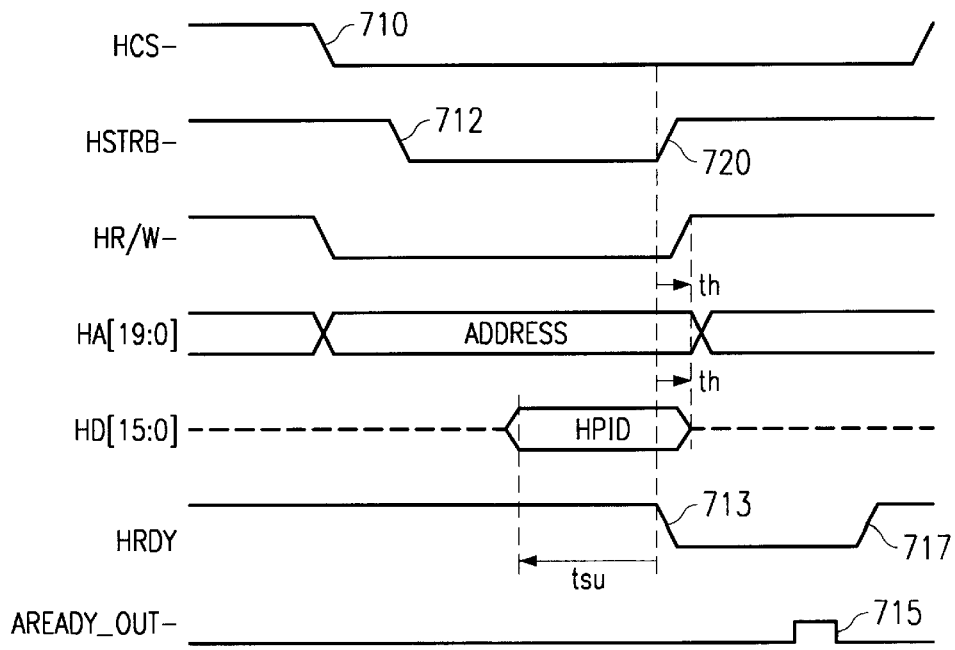
FIG. 7 is a timing diagram for signals between the host processor and the host processor interface illustrating a write access to the shared memory by the host processor of FIG. 2.

FIG. 7 is a timing diagram for signals on bus 111 between the host processor and host processor interface 115 illustrating a write access to the shared memory by host processor 110. Chip select signal HCS- is asserted (low) at time 710 to indicate that an address is present on address signals HA(19:0) and read/write signal HR/W- is de-asserted to indicate a read request. Request signal HSTRB- is asserted (low) at time 712 to request a memory access.

Host processor 110 provides data on data signals HD(15:0) for writing into the internal memory. A rising edge 720 indicates the data on data signals HD(15:0) is valid. In response to HSTRB- rising edge 720, host processor interface 115 de-asserts ready signal HRDY at 713 to indicate a write access is in progress. Once the write access is complete at 715 as indicated by Aready_out-, as described with respect to either FIG. 4 or FIG. 5, HPI 115 asserts ready signal HRDY at 717 to indicate to host 110 that the write access is complete. Advantageously, HPI 115 generates ready signal HRDY in a glitchless manner so that host processor 110 can respond to signal edges 713 and 717 without synchronizing to clock circuit 112.

Figure 8:
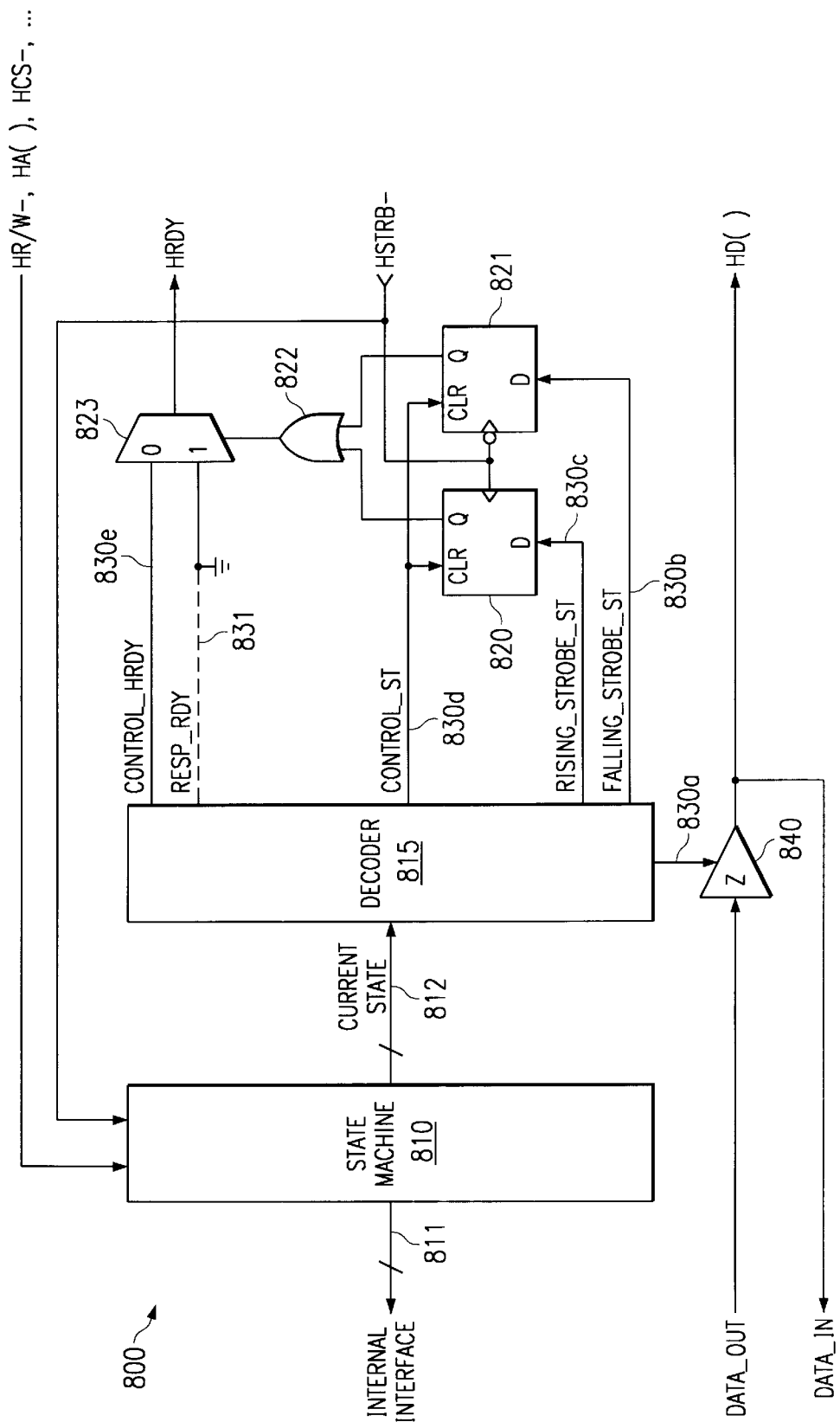
FIG. 8 is a schematic representation of an interface circuit for asynchronous glitchless signaling, according to aspects of the present invention, for use in the digital systems of FIG. 1 and FIG. 2.

FIG. 8 is a schematic representation of an interface circuit 800 for asynchronously glitchless signaling, according to aspects of the present invention, for use in the digital systems of FIG. 1 and FIG. 2. In particular, the interface circuit of FIG. 8 generates signal HRDY in response to signal HSTRB- and internal signals 811 according to FIG. 6 and FIG. 7. State machine 810 interconnects with internal functional circuitry in the digital system via interconnects 811, which represent interconnects 35 or 45 in FIG. 1 or 116 in FIG. 2.

State machine 810 provides a state value on a set of signals 812. State machine 810 is a gray code state machine in that for any change of state, only one of the signals in the set 812 changes state. Decoder 815 receives the state value and decodes it to form a set of outputs 830(a–e). Advantageously, decoder 810 responds asynchronously to state machine 810 to form clean, glitchless output signals 830(a–e) because state values 812 from state machine 810 correspond to a gray code.

Figure 9:
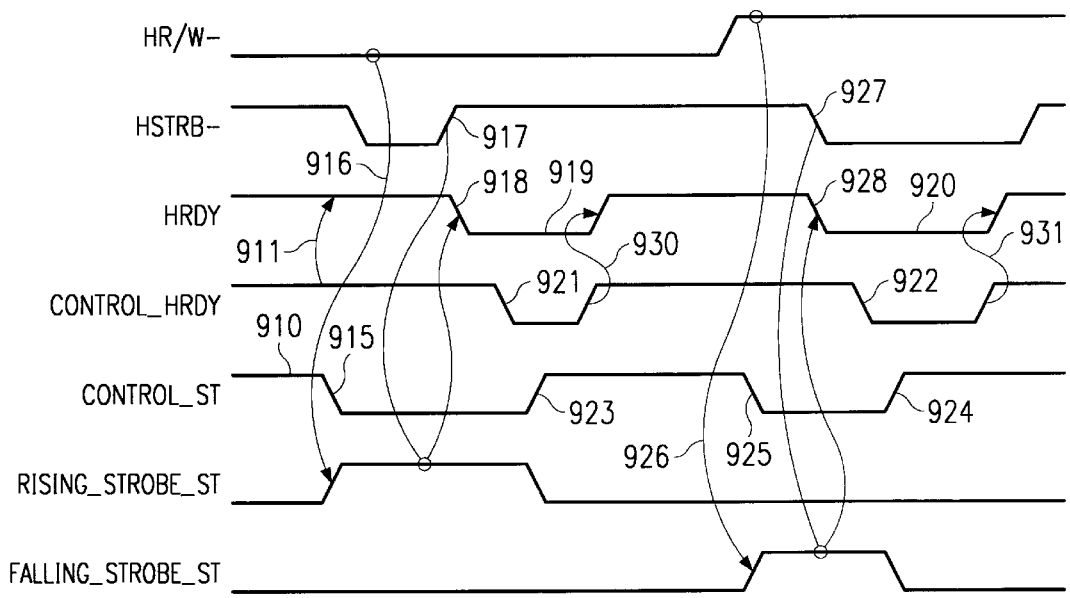
FIG. 9 is a timing diagram illustrating the operation of the interface circuit of FIG. 8.

The operation of interface circuit 800 will now be described with reference to FIG. 9 which is a timing diagram. Interface circuit 800 receives signal HSTRB- from a remote source and sends signal HRDY to a remote destination as part of a handshake sequence. Signal HRDY is immediately de-asserted by setting it to a low state in response to either a rising edge or a falling edge of signal HSTRB-, as selected by the state of the HR/W- signal as shown in FIG. 6 and FIG. 7. Initially, control_st signal 830c is asserted to clear flip-flops 820 and 821, as shown at 910. A Q output from each flip-flop is connected to OR gate 822, the output of which is connected to a select input of mux 823. When both flip-flops are cleared, the output of OR gate 822 is low. Mux 823 therefore selects the "0" input and outputs the state of control_hrdy signal 830e as signal HRDY, as shown at 911. State machine 810 provides a state which is decoded by decoder 815 to produce a high logic state on signal control_hrdy so that signal HRDY initially has a high logic state.

When chip select signal HCS- is received by state machine 810, signal control_st is de-asserted at 915 and 925 and either signal rising_strobe_st 830c is or signal falling_strobe_st 830b is asserted in response to the state of signal HR/W-, as shown at 916 and 926 respectively. If signal rising_strobe_st is asserted, then a rising edge 917 of signal HSTRB- will cause flip-flop 820 to place a logic one on the Q output. This in turn will cause OR gate 822 to place a logic one on the select input of mux 823. Mux 823 will select input "1", and a low logic state responsive to signal resp_rdy will be output immediately as signal HRDY at 918. Likewise, if signal falling_strobe_st is asserted, then a falling edge 927 of signal HSTRB- will cause flip-flop 821 to place a logic one on the Q output. This in turn will cause OR gate 822 to place a logic one on the select input of mux 823. Mux 823 will select input "1" and a low logic state responsive to signal resp_rdy will be output immediately as signal HRDY at 928.

While HRDY is in a de-asserted low state 919 or 920, state machine 810 changes state to cause signal control_hrdy to be decoded to a low state at 921 and 922. Then state machine 810 changes state again to cause signal control_st to decode to a high state at 923 and 924. This will again clear both flip-flops 820–821 so that mux 823 switches from input "1", to input "0". Since signal resp_rdy on input "1" is in a low state and signal control_hrdy on input "0" is also in a low state, mux 823 will transition without forming a glitch on output signal HRDY.

Once the internal circuitry has completed a requested operation, a signal on bus 811 causes state machine 810 to change state so that signal control_hrdy is decoded to a high logic state. Advantageously, since state machine 810 operates in a gray code manner, decoder 815 is able to decode a change in state value 812 without forming glitches on any output signal. Therefore signal control_hrdy transitions cleanly from a low state to a high state on the "0" input of mux 823 and signal HRDY responsively transitions cleanly from a de-asserted low state to an asserted high state on the output of mux 823 at 930 and 931.

Tri-state buffer 840 transfers data signals data_out to host data bus HD( ) or allows host data bus HD( ) to drive input signal lines data_in in response to a control signal 830a provided by decoder 815 responsive to state machine 810 and the value of signal HR/W-.

In an alternative embodiment of interface circuit 800, decoder 815 could have registered outputs clocked by a clock signal associated with the internal circuitry. It that case, state machine 810 would not need to be a gray code state machine. Alternatively, state machine 810 and decoder 815 can be combined.

In an alternative embodiment of interface circuit 800, signal resp_rdy is connected to a signal 831 from decoder 815 instead of being connected to ground so that the logic vales of signal HRDY can be controlled by decoder 815 for both the asserted and de-asserted states.

Figure 10:
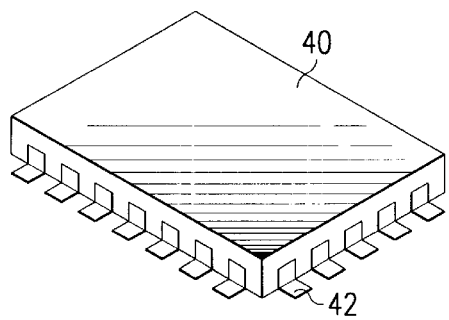
FIG. 10 is a schematic representation of an integrated circuit incorporating the digital system of FIG. 2.

FIG. 10 is a schematic representation of an integrated circuit 40 incorporating processor 100. As shown, the integrated circuit includes a plurality of contacts for surface mounting. However, the integrated circuit could include other configurations, for example a plurality of pins on a lower surface of the circuit for mounting in a zero insertion force socket, or indeed any other suitable configuration.

Figure 11:
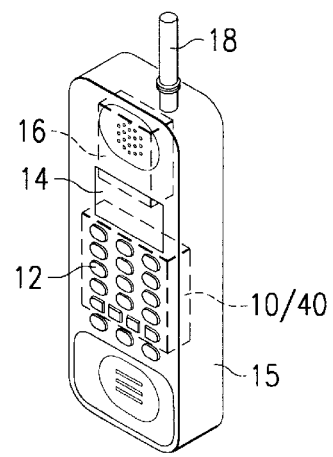
FIG. 11 illustrates an exemplary implementation of an example of such an integrated circuit in a mobile telecommunications device, such as a mobile telephone.

FIG. 11 illustrates an exemplary implementation of an example of such an integrated circuit in a mobile telecommunications device, such as a mobile telephone with integrated keyboard 12 and display 14. As shown in FIG. 11, the digital system 10 included in integrated circuit 40 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18.

Fabrication of digital system 10 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

Thus, a digital system is provided with a memory that can be shared by two or more data requesters operating in different clock domains. Various priority levels of access are provided. In a high priority access mode, the memory is connected directly to one of the requestors, such as a host processor, so that high bandwidth transfers can be performed. Interface signals between the different clock domains are generated in a glitchless manner to allow asynchronous handshaking.

An interface circuit embodying aspects of the present invention can be used to provide control signals interconnecting modules in different time domains for uses other than sharing memory, such as for accessing shared peripheral devices.

As used herein, the terms "applied," "connected," and "connection" mean electrically connected, including where additional elements may be in the electrical connection path. "Associated" means a controlling relationship, such as a memory resource that is controlled by an associated port.

While the invention has been described with reference to illustrative embodiments, this description is not intended to be construed in a limiting sense. Various other embodiments of the invention will be apparent to persons skilled in the art upon reference to this description. For example, the memory banks may operate in different combinations of sync/async; for example, the memory may operate synchronously to the DSP clock in SAM mode and synchronously to the host processor clock in HOM mode. The internal circuit which is connected to the interface circuit may be a processor, random control logic, ASIC devices, or any type of functional circuit that is responsive to a signal from a remote source.

In another embodiment, different sequences of state changes may be used to invoke a change of state in the interface signals. More complicated handshake protocols may by implemented in which two or more signals from a remote source must be received before a change of state in a handshake reply signal occurs.

It is therefore contemplated that the appended claims will cover any such modifications of the embodiments as fall within the true scope and spirit of the invention.

What is claimed is:

1. A digital system, comprising:
    an internal circuit;
    an interface circuit connected to the internal circuit, the interface circuit having a first input for receiving a first signal from a remote source, a second input for receiving a third signal that is received from the remote source, and an output for sending a second signal to a remote destination in response to the first signal;

wherein the interface circuit is operable to immediately set the second signal to a first state in a glitchless manner in response to a signal edge in the first signal;

wherein the interface circuit is further operable to set the second signal to a second state in a glitchless manner in response to the internal circuit;

wherein the interface circuit is further operable to selectively set the second signal to the first state in response to either a rising edge in the first signal or a falling edge in the first signal as selected by the third signal;

wherein the interface circuit comprises a first flip-flop and a second flip-flop connected to receive the first signal as a clock input, such that a first flip flop is responsive to a rising edge on the first signal and the second flip-flop is responsive to a falling edge on the first signal; and wherein the interface circuit further comprises a state machine connected to the internal circuit, the first input and the second input and having a plurality of state outputs; and wherein the state machine is operable to generate a plurality of gray code states such that only one output of the plurality of outputs changes on each state change.

2. The digital system of claim 1, wherein the interface further comprises a decoder connected to the state machine to receive the plurality of state outputs, the decoder having a plurality of decode outputs, with a first decode output connected to the first flip-flop, a second decode output connected to the second flip-flop, a third decode output connected to the first flip-flop and to the second flip-flop, and a fourth decode output connected to first input on a multiplexer, the multiplexer having an output connected to the output of the interface circuit for providing the second signal.

3. A digital system, comprising:

an internal circuit;

an interface circuit connected to the internal circuit, the interface circuit having a first input for receiving a first signal from a remote source, an output for sending a second signal to a remote destination in response to the first signal, and a second input for receiving a third signal, wherein the interface circuit is operable to immediately set the second signal to a first state in a glitchless manner in response to a signal edge in the first signal, and further operable to set the second signal to a second state in a glitchless manner in response to the internal circuit, the interface circuit comprising:

a first flip-flop and a second flip-flop connected to receive the first signal, such that a first flip flop is responsive to a rising edge on the first signal and the second flip-flop is responsive to a falling edge on the first signal; and a state machine connected to the internal circuit, the first input and the second input and having a plurality of state outputs; and wherein the state machine is operable to generate a plurality of gray code states such that only one output of the plurality of outputs changes on each state change.

4. The digital system according to claim 3 being a cellular telephone wherein one of the internal circuit is a microprocessor, further comprising:

an integrated keyboard (12) connected to the microprocessor via a keyboard adapter;

a display (14), connected to the microprocessor via a display adapter;

radio frequency (RF) circuitry (16) connected to the microprocessor; and an aerial (18) connected to the RF circuitry.

5. The digital system of claim 1, wherein the interface circuit is further operable to selectively set the second signal to the first state in response to either a rising edge in the first signal or a falling edge in the first signal as selected by the third signal.

6. The digital system of claim 5, wherein the third signal is received from the remote source.

7. The digital system of claim 1, wherein the interface further comprises a decoder connected to the state machine to receive the plurality of state outputs, the decoder having a plurality of decode outputs, with a first decode output connected to the first flip-flop, a second decode output connected to the second flip-flop, a third decode output connected to the first flip-flop and to the second flip-flop, and a fourth decode output connected to first input on a multiplexer, the multiplexer having an output connected to the output of the interface circuit for providing the second signal.

8. A digital system, comprising:

an internal circuit operable in a first clock domain;

an interface circuit connected to the internal circuit, the interface circuit having a first input for receiving a request signal from a remote source operable in a second clock domain and an output for sending a reply signal to a remote destination in the second clock domain in response to the request signal as part of a handshake sequence, wherein the first clock domain and the second clock domain operate asynchronously to each other;

the interface circuit comprising:

a first flip-flop with a rising edge sensitive clock input connected to receive the request signal, a data input connected to receive a rising edge control signal, and a data output for providing a rising edge select signal;

a second flip-flop with a falling edge sensitive clock input connected to receive the request signal, a data input connected to receive a falling edge control signal, and a data output for proving a falling edge select signal;

selection circuitry connected to receive the rising edge select signal and the falling edge select signal and having an output for providing the reply signal, wherein the selection circuitry is operable to set the reply signal to an asserted state in response to a rising edge in the request signal if the rising edge control signal is asserted, and to set the reply signal to the asserted state in response to a falling edge in the request signal if the falling edge control signal is asserted.

9. The digital system of claim 8, wherein the interface circuit further comprises a state machine/decoder circuit that has an input for receiving a mode signal from the remote source, and an output for providing the rising edge control signal and an output for providing the falling edge control signal, the state machine/decoder circuit being operable to assert the rising edge control signal only when the mode signal is in a one logical state and operable to assert the falling edge control signal only when the mode signal is in a different logic state, whereby the interface circuit provides a glitchless handshake sequence by asserting the reply signal in response to a rising edge of the request signal in one mode and in response to a falling edge of the request signal in a second mode without synchronization to the first clock domain.

* * * * *